(12) United States Patent
Beenken (10) Patent No.: US 10,144,368 B2
(45) Date of Patent: Dec. 4, 2018

(54) LICENSE PLATE FOR A VEHICLE (71) Applicant: Tönnjes ISI Patent Holding GmbH, Delmenhorst (DE)

(72) Inventor: Björn Beenken, Ganderkesee (DE)

(73) Assignee: Tönnjes ISI Patent Holding GmbH, Delmenhorst (DE)

( * ) Notice: Subject to any disclaimer, the term of this patent is extended or adjusted under 35 U.S.C. 154(b) by 0 days.

(21) Appl. No.: 15/503,849

(22) PCT Filed: Jun. 27, 2015

(86) PCT No.: PCT/EP2015/001299
§ 371 (c)(1),
(2) Date: Feb. 14, 2017

(87) PCT Pub. No.: WO2016/026543
PCT Pub. Date: Feb. 25, 2016

(65) Prior Publication Data
US 2017/0274841 A1   Sep. 28, 2017

(30) Foreign Application Priority Data
Aug. 22, 2014  (DE) .................. 10 2014 012 291

(51) Int. Cl.
*G09F 13/00*  (2006.01)
*B60R 13/10*  (2006.01)
*G09F 7/00*   (2006.01)

(52) U.S. Cl.
CPC .............. *B60R 13/105* (2013.01); *G09F 7/00* (2013.01); *B60Y 2410/111* (2013.01)

(58) Field of Classification Search
CPC ........ G09F 11/23; G09F 11/025; G09F 11/00; G09F 11/12; G09F 11/29; B60R 13/10; B60R 11/02; B60R 11/0264
See application file for complete search history.

(56) References Cited

U.S. PATENT DOCUMENTS 3,755,937 A * 9/1973 Anderson ............... B42F 17/00
40/360
6,628,209 B1 * 9/2003 Rother ................... B60R 13/10
340/693.5
(Continued)

FOREIGN PATENT DOCUMENTS

DE   202009017679 U1   4/2010
DE   102009033559 A1   5/2010
(Continued)

OTHER PUBLICATIONS

Deutsches Patent—Und Markenamt (German Patent and Trademark Office), Recherchebericht (search in connection with related application), Apr. 20, 2015.
(Continued)

*Primary Examiner* — Cassandra Davis
(74) *Attorney, Agent, or Firm* — Laurence P. Colton; Smith Tempel Blaha LLC (57) ABSTRACT

License plates (10) and number plates of vehicles are frequently forged or used for altered or stolen vehicles. To prevent this, license plates (10) are known, with which a contactlessly readable identification means (19) is associated in a license plate surface (12). This identification means (19) contains relevant data of the vehicle to which the license plate (10) belongs. As the license plate surface (12) is provided, primarily for motor vehicle identification or as a surface for the lettering (15), with numbers and digits for identification purposes, only little space or limited space remains for a further identification means (19). The invention provides a license plate (10) for a vehicle having an identification means (19), in which the at least one identification means (19) is associated with the periphery (13) of the license plate (10) which surrounds the license plate surface (12).

15 Claims, 6 Drawing Sheets

(56) References Cited

U.S. PATENT DOCUMENTS

| | | | | |
|---|---|---|---|---|
| 7,923,962 | B2* | 4/2011 | Jovanovich | B60R 13/10 |
| | | | | 320/101 |
| 7,936,269 | B2* | 5/2011 | Persson | B60R 11/02 |
| | | | | 248/352 |
| 2007/0171077 | A1* | 7/2007 | Kawarizadeh | B60R 11/0264 |
| | | | | 340/572.8 |
| 2008/0042848 | A1* | 2/2008 | Roberts | B60R 13/10 |
| | | | | 340/572.7 |
| 2009/0058602 | A1* | 3/2009 | Harinck | B60R 13/10 |
| | | | | 340/10.1 |
| 2009/0265966 | A1 | 11/2009 | Persson | |
| 2011/0258894 | A1* | 10/2011 | Beenken | B60R 13/10 |
| | | | | 40/208 |

FOREIGN PATENT DOCUMENTS

| | | |
|---|---|---|
| JP | H0379516 U | 4/1991 |
| JP | H0585307 A | 4/1993 |
| JP | 2006088759 A | 4/2006 |
| JP | 2012507896 A | 3/2012 |
| KR | 1020110088532 | 8/2011 |
| WO | 9919170 A1 | 4/1999 |
| WO | 2008141636 A1 | 11/2008 |
| WO | 2010051980 A1 | 5/2010 |

OTHER PUBLICATIONS

WIPO, International Search Report (on priority application), dated Oct. 6, 2015.

Japan Patent Office, Search in related application, dated Mar. 22, 2018.

Korean Intellectual Property Office, Notification of Grounds for Refusal, dated May 15, 2018.

* cited by examiner

LICENSE PLATE FOR A VEHICLE

CROSS REFERENCE TO RELATED APPLICATIONS

This patent application is the US National Phase of International Application No. PCT/EP2015/001299 having an international filing date of 27 Jun. 2015, which claims priority from and the benefit of German Patent Application No. 102014012291.3 having a filing date of 22 Aug. 2014.

BACKGROUND OF THE INVENTION

Technical Field

The invention relates to a license plate for a vehicle, in particular a motor vehicle license plate, having a license plate body, which has a license plate surface having a coating, a periphery, which at least partially surrounds the license plate surface, and having at least one identification means.

Prior Art

License plates according to the invention are what are commonly referred to as number plates, which are attached at the front and rear of the chassis or the bumper of a vehicle and those that are stuck to a window of a vehicle, in particular as additional license plates.

License plates of the type mentioned are frequently forged or used for altered vehicles. In order to prevent this, license plates are known which have an identifying means that is contactlessly readable or a data carrier. The latter contains relevant data of the vehicle to which the license plate belongs. Reading said data is effected using an external reader. The comparison of the read data with the vehicle on which the license plate is used allows conclusions regarding manipulations to be drawn, in particular if the license plate is associated with an altered vehicle.

In the license plates having contactless readable identification means that have been known hitherto, the identification means are associated with a license plate surface of the license plate. Since the license plate surface is provided primarily for the motor vehicle identification or as a surface for providing numbers and digits, only little room or limited room remains for a further identification means.

BRIEF SUMMARY OF THE INVENTION

The invention is based on the object of providing a license plate having an identification means.

A license plate, in particular a motor vehicle license plate, for achieving this object has a license plate body, which has a license plate surface having a coating, a periphery, which at least partially surrounds the license plate surface, and having at least one identification means, characterized in that at least one identification means is associated with the periphery. In this license plate, at least one identification means is associated with the periphery of the license plate. Said periphery at least partially surrounds the license plate surface of the license plate. The license plate furthermore has a license plate body having the license plate surface and a coating.

According to a preferred development of the invention, provision is made for the periphery of the license plate surface to be configured as a mount, preferably as a collar. This mount surrounds the license plate surface at least partially and results in stabilization of the license plate. The mount of the license plate is arranged at a distance from the license plate surface such that no letters or digits are located thereon.

Provision is preferably made for the periphery to have a deformation, preferably is stamped by a Z-shaped, H-shaped or U-shaped cross section, in particular for the periphery to have no deformation. By stamping the license plate, the latter is given, due to its profiled periphery, a high stability against bending or twisting.

In addition, stamping brings about a periphery whose front side rises as a convex, roof-type profile over the top side of the license plate surface. The corresponding rear of the periphery has a corresponding convex, roof-type profile, which is a negative of the front side and is therefore suitable for receiving objects, such as for example the identification means.

Provision is preferably furthermore made for the periphery to be at least partially offset with respect to a plane of the license plate surface, in particular for the periphery to be situated in the same plane as the license plate surface. Especially when stamping the license plate, as a result of which it obtains a U-shaped cross section, a surface of the periphery is at least partially parallel to the plane of the license plate surface. With particular preference, the identification means can be associated with said parallel plane of the periphery. The parallel alignment of the plane facilitates in particular the reading of the identification means.

A further preferred embodiment of the license plate makes provision for the at least one identification means to be associated with a top side and/or a bottom side of the periphery, in particular at least partially integrated in the license plate body. When assigning the at least one identification means on the top side of the periphery, the identification means can be applied directly onto the top side of the periphery. To this end, the identification means can have a self-adhesive layer on the front side and/or on the rear. When assigning the identification means to the bottom side of the periphery, the identification means is not visible from outside. It is additionally conceivable for the license plate body to have a hollow or a cutout, in which the at least one identification means is, at least partially, inserted. By way of this integration of the identification means in the license plate body, the identification means is affixed at a specific location of the license plate and protected against external influences.

The invention in particular makes further provision for the at least one identification means to extend over at least an edge region of the deformation of the periphery, preferably around an edge of the license plate body. The identification means can here be attached on the top side and the bottom side of the periphery over a large area, at least partially, for improved contact with the license plate. However, it is likewise conceivable that the identification means is placed in or adhesively bonded to the stamped form of the license plate and is here adhesively bonded to the stamped element.

It is likewise conceivable for the identification element to have a tab-like extension which protrudes from the attachment, for example having an adhesive. It is likewise conceivable for the tab-like extension to extend around the edge of the license plate body, from the rear to the front side, and to be fixed by the coating, in particular between the coating and the front side of the license plate body.

According to the invention, provision is furthermore made for the at least one identification means to be associated with a perforation in the periphery of the license plate. This perforation can be in the form of an elongate slot along a longitudinal axis or transverse axis of the license plate. This slot extends parallel to the periphery and can be open on one side.

The invention furthermore preferably makes provision for the perforation to be covered, preferably by a demetalized strip on the front side of the license plate as part of the coating, in particular in a way such that the at least one identification means is not visible. Due to this covering of the perforation or of the identification means, the latter is protected against environmental influences, while it remains invisible for an outside observer and will thus elude any manipulation attempts.

The invention furthermore makes provision for the at least one identification means to be cast into the periphery, preferably embedded in a stamped hollow of the periphery by way of encapsulation. To this end, the identification means is preferably brought into contact with the rear of the stamped periphery, or is adhesively bonded into the stamped hollow and is thereupon provided with or embedded in encapsulation, for example epoxide resin. In this way, the identification means is connected fixedly and releasably to the license plate and is protected against any environmental influences. The identification means can additionally be supported by a license plate adhesive frame.

A further advantageous exemplary embodiment of the invention makes provision for the periphery to be provided in a different color than the license plate surface, in particular with a different paint or coloration, preferably for the at least one identification means to be covered by this paint or coloration. The covering of the identification means by the paint or coloration prevents direct visibility of the identification means. The paint may be a reflective paint or any other paint.

Further provision is made in particular for the periphery to have a coating or imprint, preferably for the periphery to be formed by way of lettering or an imprint, and for the at least one identification means to be associated with this lettering or imprint.

Provision is additionally made for a reflective coating which is preferably homogeneous and uniform to be associated with the license plate surface and/or the periphery. The reflective coating can be a reflective film having, for example, glass beads and/or prismatic properties.

Provision is preferably furthermore made for the at least one identification means to be a data carrier, which in particular has a chip, a coil or a carrier, wherein at least one antenna and/or an amplification element is preferably associated with the data carrier.

Provision is additionally made for the at least one data carrier to generate a magnetic field and to have an antenna which is formed through the at least one slot in the periphery of the license plate body. The license plate body is, at least partially, made of an electrically conductive material, for example a sheet of aluminum. The data carrier, which generates a magnetic field, and the antenna thus form a license plate having a transponder. The slot in the at least partially conductive license plate body leads to inductive coupling of the data of the data carrier in the license plate body serving as an antenna. The antenna, in particular the slot or the data carrier, here simultaneously serves as an amplifier. The data of the data carrier is thus readable from the license plate without additional components and without connecting the data carrier, even from a relatively large distance.

Provision is additionally made for the data carrier to be arranged in an electrically insulated fashion at or in the slot, in particular preferably at a closed end of the slot. The data carrier is thus able to be accommodated or integrated in the license plate body, without it requiring additional installation space, and is not perceivable from the outside of the license plate either. Provision is additionally preferably made for the data carrier, in particular for the electrically conducting components thereof, to have no contact with the license plate body of the license plate, in particular no electrically conducting contact. Formed between the conducting components of the data carrier and the slot in the license plate body is a circumferential gap or an interspace, whereby particularly effective contactless coupling of the data carrier to the electrically conductive license plate carrier of the license plate is effected. This coupling is effected inductively by way of the magnetic field generated by the data carrier.

Provision can furthermore be made for the slot to be provided with at least one perforation, whereby a regionwise extension of the slot is effected. The perforation is preferably associated with an end of the slot, such that the slot end is enlarged by the perforation. By arranging the data carrier in the region of the extension at an end of the slot made by the perforation, sufficient space even for larger data carriers is provided in the license plate body. The data carrier is here located within the outlines of the license plate carrier, specifically without being brought into physical or electrical contact therewith. The data carrier is not perceivable in the interior of the license plate, as a result of which invisible electrical or electronic security of the license plate is provided.

Provision is furthermore made for the data carrier to be attached in insulated fashion in the stamping hollow, such that the conductive components thereof have no conducting connection to the license plate body which is formed from a conducting material. Thus magnetic or inductive coupling, in particular of a slot of the data carrier to the license plate body, also comes about. Here, the license plate body serves not only as an antenna, but preferably at the same time as an amplifier, as a result of which the data of the data carrier is readable even from a relatively large distance. The bottom of the depression of the stamping hollow can additionally be provided with a through-opening which is smaller than the data carrier, such that the data carrier is fixable despite this opening and the depression. The opening leads to an improvement in the antenna effect and primarily to improved amplification of the transmission power of the chip of the data carrier.

The identification means or the data carrier preferably has at least one chip, preferably a passive radio-frequency identification chip (RFID chip), at least one electrically conducting coil connected thereto, and a carrier made of an insulating material. The carrier facilitates the fixation of the data carrier in the license plate body. Mainly, the carrier which is formed from an insulator ensures that the chip and the coil of the data carrier are able to be integrated in the license plate so as to be insulated with respect to the license plate body, with the result that inductive and/or magnetic coupling of the signals of the chip to in particular the license plate body of the license plate is effected. It is additionally conceivable according to the invention for the identification means or the data carrier to be a printed or lasered one-dimensional or two-dimensional barcode or a digital signature.

It is furthermore conceivable for the data carrier to be a hologram, a security print or a special UV print. In all these exemplary embodiments, provision is made for the legibility or readability of the identification means or of the data carrier or of a hologram not to be negatively affected by said coatings or colorations.

Provision is furthermore made for the at least one identification means or the carrier to be plate-like, preferably to be flexurally rigid or limp in the form of a film. This film can additionally be self-adhesive. The flexibility of the film is such that it can be placed into the stamping hollow or around an edge of the license plate body.

The invention can furthermore provide for the at least one identification means to be arranged only outside the license plate surface. As a result, the surface for the provision of lettering is not limited and the arrangement of the identification means is subject to no limitations due to the lettering on the license plate surface.

BRIEF SUMMARY OF THE DRAWINGS

Preferred exemplary embodiments of the invention will be explained in more detail below with reference to the drawing, in which.

DETAILED DESCRIPTION OF PREFERRED EMBODIMENTS

Figure 1:
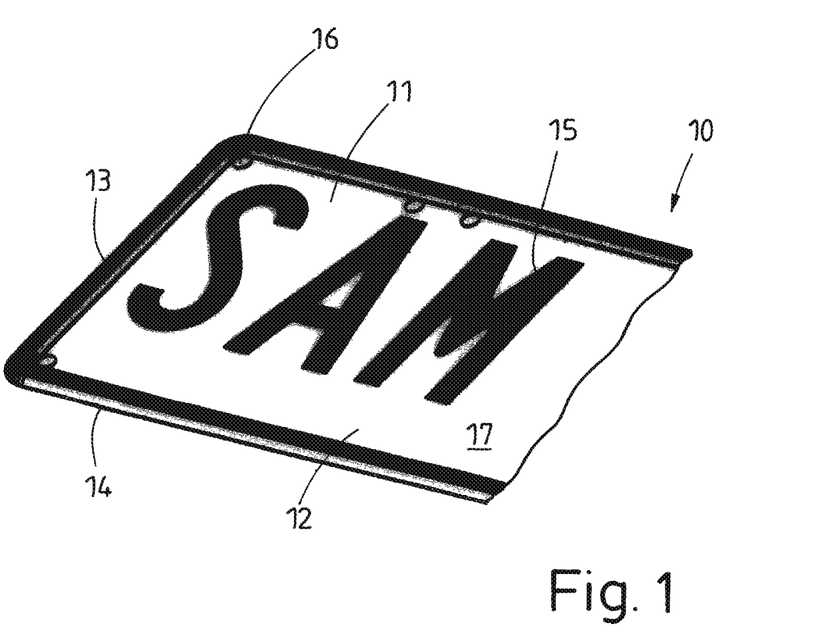
FIG. 1 shows a section of a license plate.

FIG. 1 illustrates, by way of example, a section of a license plate 10, in particular of a motor vehicle license plate, having a plate-type license plate body 11, a license plate surface 12, a periphery 13 which surrounds the license plate surface 12, an edge 14 which surrounds the license plate body 11, and lettering 15 located on the license plate surface 12. The license plate 10 has a rectangular configuration, with its dimensions corresponding to those of a typical vehicle license plate. The license plate body 11 is configured at its periphery 13 as a fold. This fold is provided in the license plate body 11 using a forming process, preferably by way of stamping.

License plates 10 of this type, what are referred to as number plates, are typically placed at the front and rear of the vehicle, specifically at the chassis and/or the bumper. The license plate 10 additionally has a plurality of attachment holes 16.

Inside the periphery 13 or a mount, the license plate body 11 has a license plate surface 12. Located on the license plate surface 12 is the lettering 15 of the license plate 10. The lettering 15 is preferably provided in the license plate surface 12 likewise by way of stamping (FIG. 1).

Figure 2:
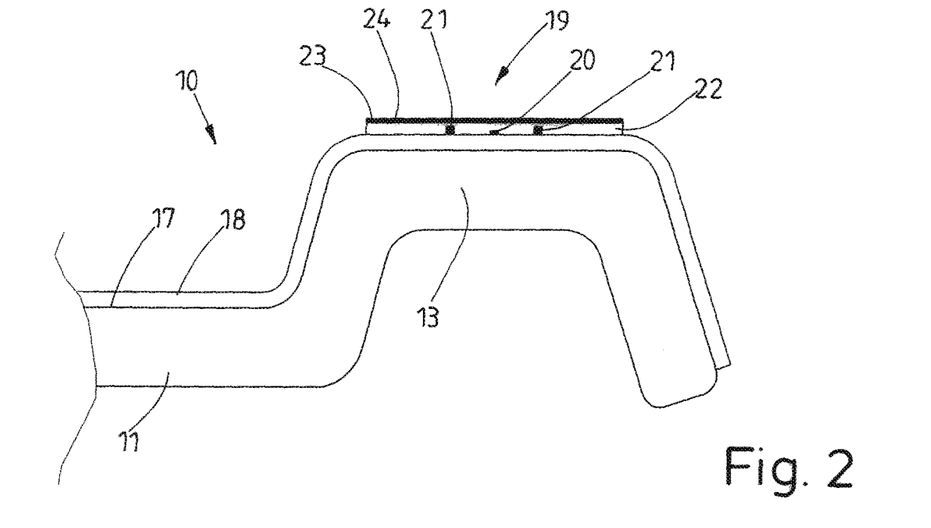
FIG. 2 shows a cross section through a license plate according to the invention.

The license plate body 11 is made of a metal, preferably aluminum, or a plastic having a thickness of a few millimeters. The license plate body 11 is coated on a front side 17. This coating is preferably in the form of a self-adhesive, reflective film 18. The film 18 covers the entire front side 17 of the license plate 10 (FIG. 2). Provided on this film 18 is, according to the exemplary embodiment 2, an identification means 19 at the periphery 13. This identification means 19 is attached to the film 18, preferably adhesively bonded thereto. The identification means 19 is in the form of a transponder and has a, in particular passive, data carrier 20 and an antenna 21, which is illustrated in FIG. 2 in cross section and communicates with the data carrier 20. The data stored on the data carrier 20 is contactlessly readable via the antenna 21.

The data carrier 20 and thus the identification means 19 has selected data of the vehicle to which the license plate 10 belongs. The data carrier 20 has a passive chip, which is here in the form of a passive radio-frequency identification chip (RFID chip), a coil which here forms the antenna 21, and a non-conducting carrier 22 (RFID hardtag). The carrier 22 is made of a non-conducting material, for example a plastic, in the form of a carrier film or a carrier body. The passive RFID chip which is associated with the data carrier 20 operates in a frequency range of between 800 MHz and 1000 MHz. The RFID chip generates a magnetic field which is inductively coupled via the antenna 21.

On a top side 23, the identification means 19 or the carrier 22 has a coloration 24 or a coating. This coloration 24 has the effect that the identification means 19 is not visible and is thus protected against any unauthorized removal. In the exemplary embodiment illustrated in FIG. 2, the identification means 19 is set apart from the license plate surface 12 and is located only on the periphery 13 of the license plate 10.

Figure 3:
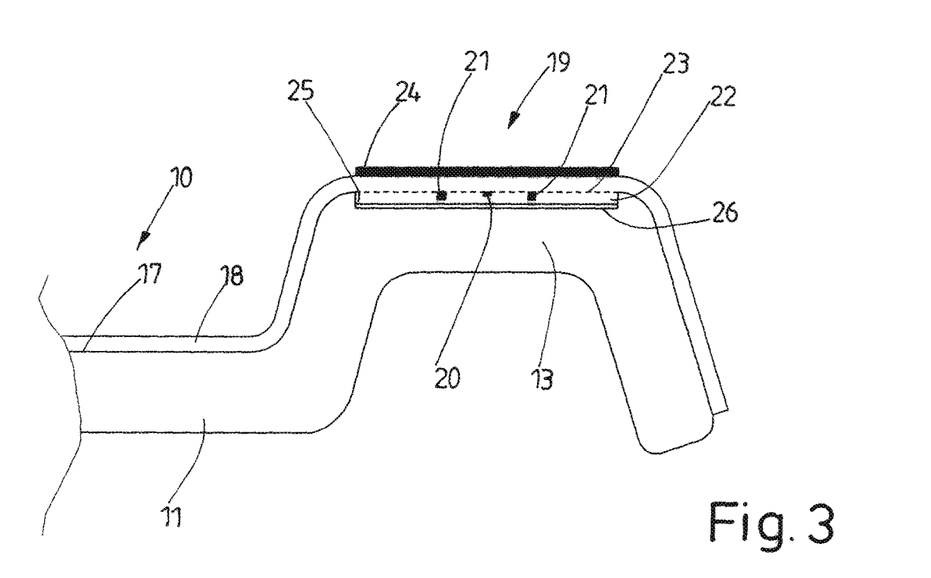
FIG. 3 shows a second exemplary embodiment of a license plate in an illustration according to FIG. 2.

In the exemplary embodiment illustrated in FIG. 3 of the invention, the identification means 19 is associated with the periphery 13 of the license plate 10, exactly as in FIG. 2, but the periphery 13 in FIG. 3 has an embossed or milled hollow-type depression 25, which matches the identification means 19 in terms of shape. The identification means 19 is associated with the depression 25 such that the top side 23 of the data carrier 20 and the front side 17 of the license plate body 11 are located in one plane. Located between the carrier 22 and the periphery 13 is an absorber 26, which protects the identification means 19, in particular the data carrier 20, against mechanical impacts.

In the exemplary embodiment illustrated in FIG. 3, the data carrier 20 and the antenna 21 are associated with the carrier 22 such that they face the film 18. The top side 23 of the identification means 19 is covered directly by the film 18. In order to prevent the identification means 19 from being directly visible, the film 18 is provided with a coloration 24, specifically exactly over the region which corresponds to the identification means 19.

Figure 4:
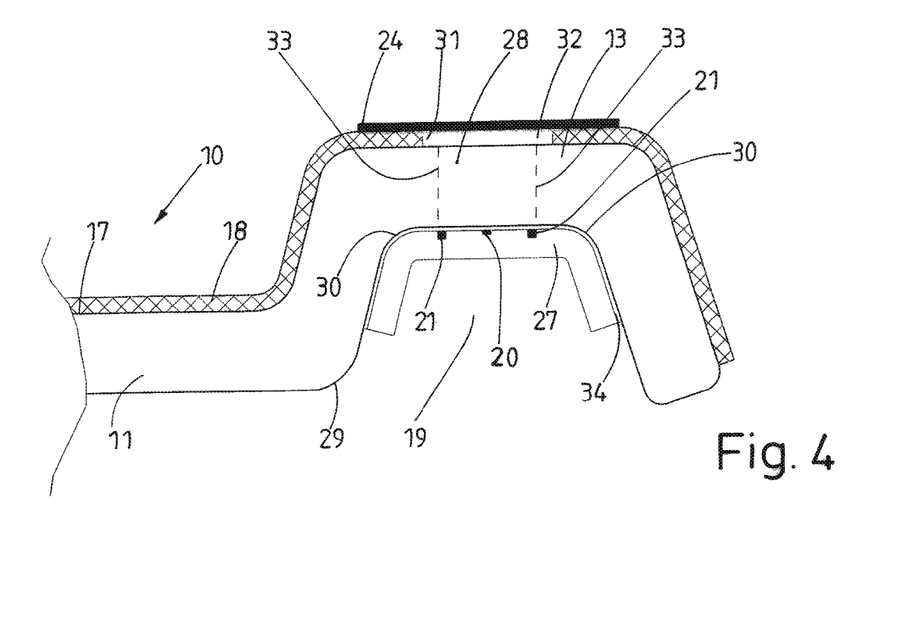
FIG. 4 shows a third exemplary embodiment of a license plate in an illustration according to FIG. 2.

The periphery 13 of the license plate 10 that is illustrated in FIG. 4 has a perforation 28. This perforation 28 can be in the form of a slot and can extend parallel to the periphery 13 over several centimeters. In the exemplary embodiment of the license plate 10 illustrated in FIG. 4, the identification means 19 is associated with a rear 29 of the license plate 10, specifically exactly that periphery region in which the perforation 28 is also located. The carrier 27 of the identification means 19 is, in this exemplary embodiment, in the form of a flexurally rigid carrier film. The carrier 27 here extends over two edge regions 30 of the U-shaped periphery 13.

At the front side 17, exactly where the perforation 28 is located, the film 18 also has a cutout 31. This cutout 31 in the film 18 is bridged by a strip 32, preferably a demetalized strip. This strip 32 in turn prevents the identification means 19 from becoming directly visible. In addition, the demetalized strip 32 prevents an electrically conducting connection from forming between the flanks 33 of the perforation 28. The antenna 21 is associated with the rear 29 exactly such that it corresponds to the flanks 33 of the cutout 31. The antenna 21 is electrically insulated from the flanks 33 of the perforation 28 by way of a thin layer 34, in particular an adhesive layer. The antenna 21 can couple to the perforation 28, which acts as a slot antenna, by way of inductive coupling. The perforation 28, which is in the form of a slot antenna, here thus acts as an antenna 21 or amplifier for the data carrier 20.

The perforation 28 can be open on one side or closed. Due to the amplification of the antenna 21 through the perforation 28 or the slot, the signals of the identification means 19 are amplified, as a result of which the relevant data can be read even at a relatively large distance from the license plate 10. The exemplary embodiment of the identification means 19 illustrated in FIG. 4 is in the form of an RFID label.

Figure 5:
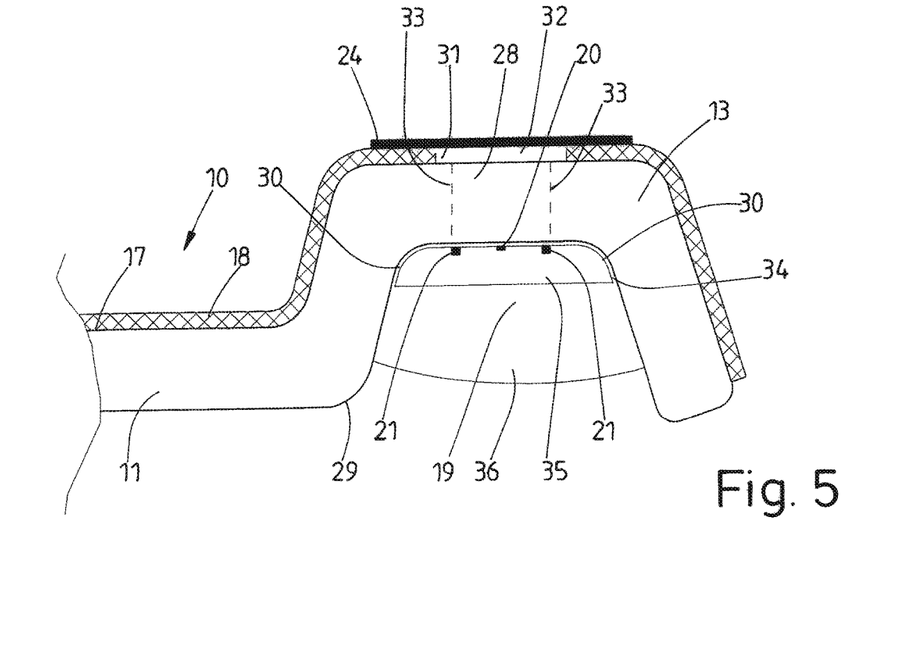
FIG. 5 shows a fourth exemplary embodiment of a license plate in an illustration according to FIG. 2.

The exemplary embodiment of the invention illustrated in FIG. 5 differs from the exemplary embodiment illustrated in FIG. 4 only in that the identification means 19 has a fixed carrier body 35, which is cast on the rear 29 of the periphery 13 with an encapsulation 36 which encapsulates the identification means 19. The identification means 19 is embedded between the edge regions 30 of the periphery 13. The demetalized strip 32 is located exactly in the cutout 31 of the film 18. Located above the film 18 and the demetalized strip 32 is, as in the exemplary embodiment of FIG. 2, a coloration.

Figure 6:
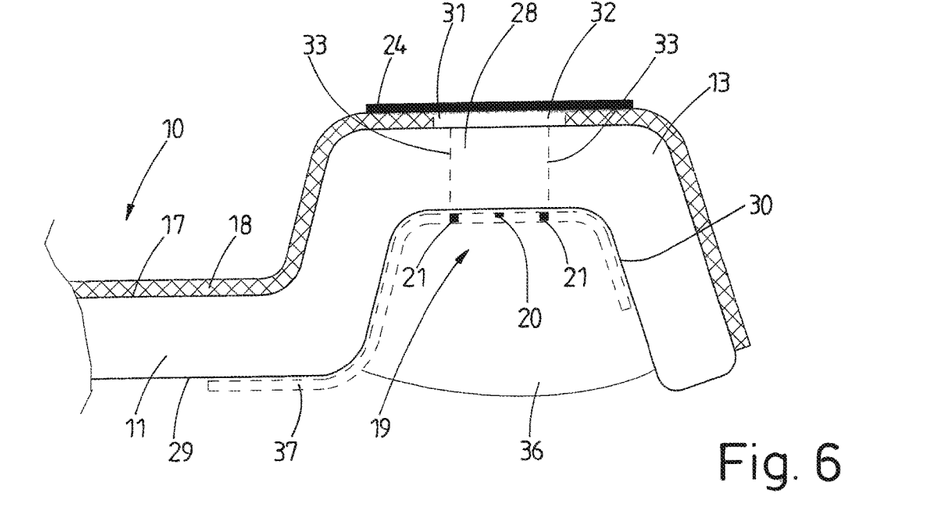
FIG. 6 shows a fifth exemplary embodiment of a license plate in an illustration according to FIG. 2.

The exemplary embodiment of the invention illustrated in FIG. 6 substantially corresponds to that in FIG. 5. In contrast to the exemplary embodiment of FIG. 5, the identification means 19 in FIG. 6 has a carrier film 37. This carrier film 37 extends from the rear 29 of the license plate to the periphery 13, over both edge regions 30 and the perforation 28, and is here partially covered by the encapsulation 36. One end of the carrier film 37 protrudes from the encapsulation 36 (FIG. 6). Such a carrier film 37, which is placed into the periphery 13 in a self-adhesive manner, can be connected particularly easily to the license plate 10. The end of the carrier film 37 that is not covered by the encapsulation 36 can be used as a tab of the carrier film 37 or of the RFID label.

Figure 7:
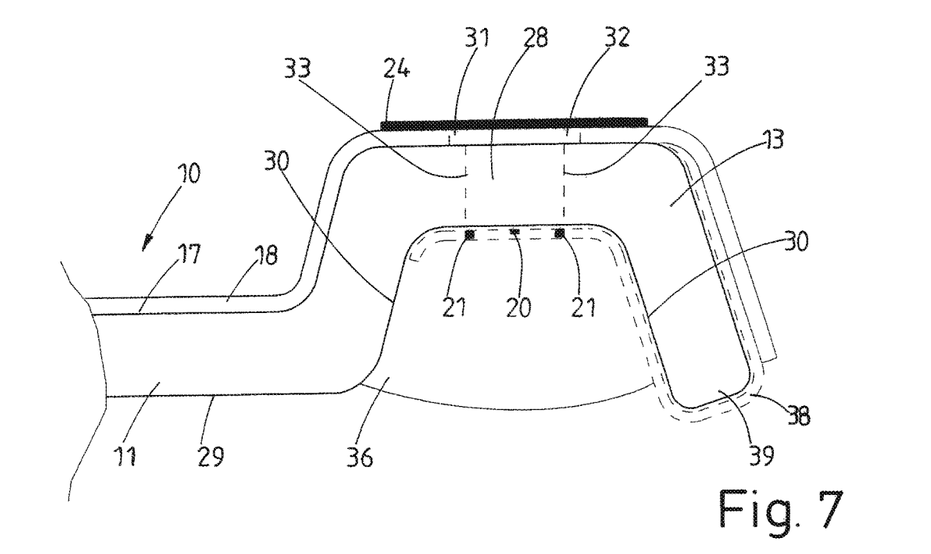
FIG. 7 shows a sixth exemplary embodiment of a license plate in an illustration according to FIG. 2.

In the exemplary embodiment of the license plate 10 illustrated in FIG. 7, the identification means 19 has a carrier film 38 which extends out of the edge region 30 and out of the encapsulation 36 around an external edge 39 from the rear 29 to the front side 17 of the license plate body 11. The part of the carrier film 38 that extends out of the encapsulation 36 extends on the front side 17 of the license plate 10 between the film 18 and the front side 17. The identification means 19 or the carrier film 38 is protected against manipulations by way of this cladding of the film 18.

Figure 8:
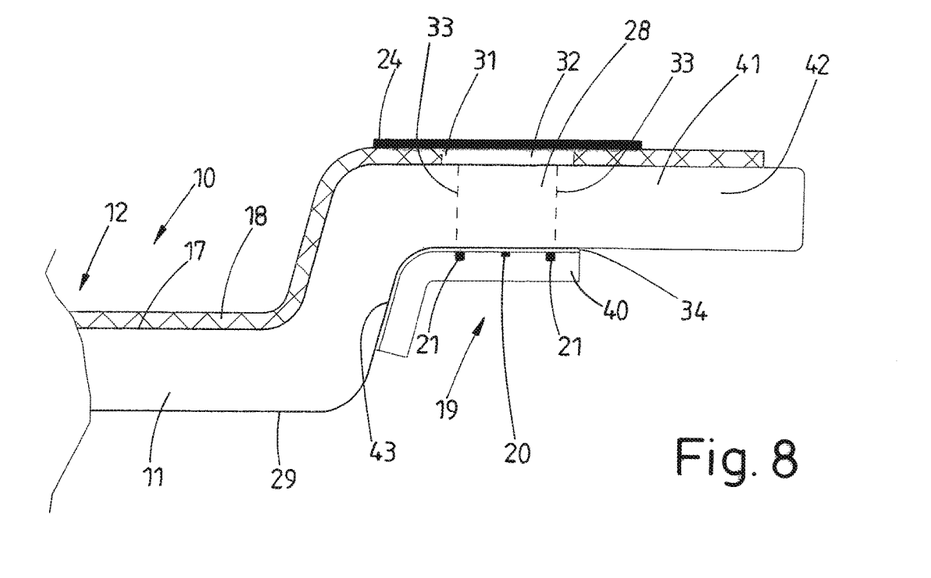
FIG. 8 shows a seventh exemplary embodiment of a license plate in an illustration according to FIG. 2.

The periphery 41 of the license plate 10 illustrated in FIG. 8 is Z-shaped. The periphery 41, parallel to the license plate surface 12, has a peripheral region 42 with which, as described in the previous exemplary embodiments, a perforation 28, a cutout 31, a demetalized strip 32, a coloration 24 are associated. The identification means 19 is applied to the rear 29 of the peripheral region 42 such that the antenna 21 is at least in inductive contact with the flanks 33. The carrier of the identification means 19 is in the form of a carrier film 40 and extends from the region of the perforation 28 over an edge region 43. The carrier film 40 is self-adhesive and associated with the rear 29 in an adhesive manner.

Figure 9:
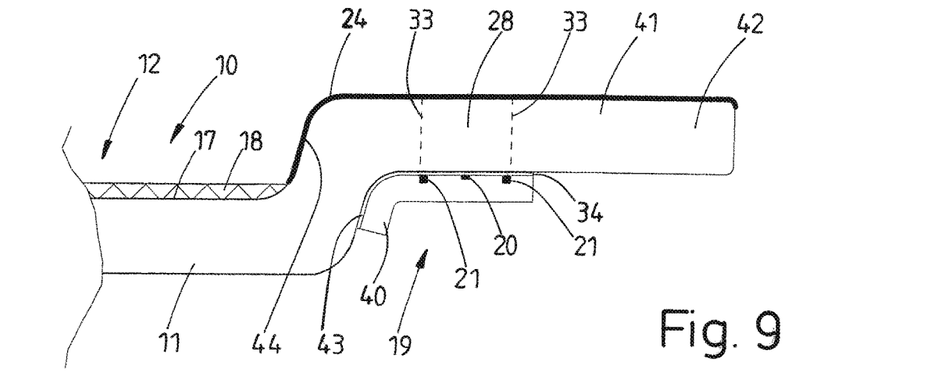
FIG. 9 shows an eighth exemplary embodiment of a license plate in an illustration according to FIG. 2.

The exemplary embodiment of the invention illustrated in FIG. 9 differs from that in FIG. 8 merely in that the film 18 is limited only to the license plate surface 12 and does not extend to the peripheral region 42 as well. In this exemplary embodiment, the coloration 24 or a varnish extends over the entire peripheral region 42 and also partially over an edge region 44 of the front side 17. The perforation 28 is thus covered directly by the coloration 24 and no longer requires an additional demetalized strip 32.

Figure 10:
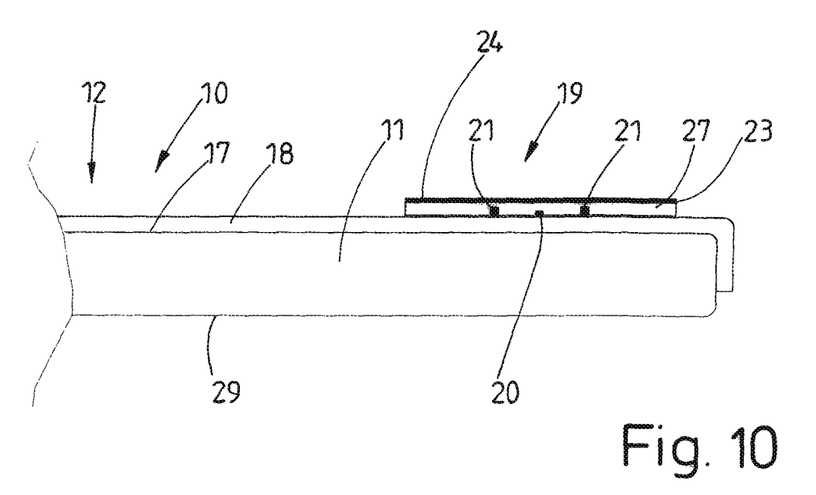
FIG. 10 shows a ninth exemplary embodiment of a license plate in an illustration according to FIG. 2.

Furthermore, provision is made according to the invention for a periphery 45 of the license plate 10 to be able to be located in one plane with the license plate surface 12 (FIG. 10). In this exemplary embodiment, as in the exemplary embodiment of FIG. 2, the identification means 19 is provided on the film 18, which is located on the front side 17 of the periphery 45. The top side 23 of the carrier 27 is provided with a coloration 24 in order to avoid direct visibility of the identification means 19. This exemplary embodiment is able to be produced particularly simply and to be used universally.

At this point it should be noted that the license plate according to the invention is not limited to the illustrated exemplary embodiments.

LIST OF REFERENCE SIGNS

10 license plate
11 license plate body
12 license plate surface
13 periphery
14 edge
15 lettering
16 attachment hole
17 front side
18 film
19 identification means
20 data carrier
21 antenna
22 carrier
23 top side
24 coloration
25 depression
26 absorber
27 carrier
28 perforation
29 rear
30 edge region
31 cutout
32 strip
33 flank
34 layer
35 carrier body
36 encapsulation
37 carrier film
38 carrier film
39 edge
40 carrier film
41 periphery
42 peripheral region
43 edge region
44 edge region
45 periphery

What is claimed is:

1. A license plate (10) comprising:
   a license plate body (11) defining a license plate surface (12) having a coating and a periphery (13, 41, 45), the periphery at least partially surrounding the license plate surface (12), and the periphery (13, 41, 45) having a deformation; and
   at least one identification means (19), wherein the at least one identification means (19) is associated with a covered perforation (28) in the periphery (13, 41, 45) and the at least one identification means (19) extends over at least one edge region (30) of the deformation of the periphery (13, 41, 45).

2. The license plate (10) as claimed in claim 1, wherein the periphery (13, 41, 45) of the license plate surface (12) is in the form of a collar.

3. The license plate (10) as claimed in claim 1, wherein the periphery (13, 41, 45) is stamped with a Z-shaped or U-shaped cross section.

4. The license plate (10) as claimed in claim 3, wherein the at least one identification means (19) extends around an edge (39) of the license plate body (11).

5. The license plate (10) as claimed in claim 1, wherein the periphery (13, 41, 45) is at least partially offset with respect to a plane of the license plate surface (12).

6. The license plate (10) as claimed in claim 1, wherein the at least one identification means (19) is associated with a top side (23) and/or a bottom side of the periphery (13, 41, 45).

7. The license plate (10) as claimed in claim 1, wherein the at least one identification means (19) is cast in the periphery (13, 41, 45).

8. The license plate (10) as claimed in claim 1, wherein the periphery (13, 41, 45) has a coating or imprint.

9. The license plate (10) as claimed in claim 1, wherein the at least one identification means (19) is a data carrier (20), which comprises a chip, a coil, and a carrier (27), wherein at least one antenna (21) and/or an amplifier element is associated with the data carrier (20), and wherein the coil and/or the slot is configured as the at least one antenna (21).

10. The license plate (10) as claimed in claim 9, wherein the at least one identification means (19) is configured to be plate-like and flexurally rigid or limp in the form of a film (37, 38, 40).

11. The license plate (10) as claimed in claim 1, wherein the at least one identification means (19) is arranged outside the license plate surface (12).

12. The license plate (10) as claimed in claim 1, wherein the at least one identification means (19) is integrated at least partially in the license plate body (11).

13. The license plate (10) as claimed in claim 1, wherein the perforation (28) is covered by a demetalized strip (32).

14. The A license plate (10) comprising:
    a license plate body (11) defining a license plate surface (12) having a coating and a periphery (13, 41, 45), the periphery at least partially surrounding the license plate surface (12), and the periphery (13, 41, 45) having a deformation; and
    at least one identification means (19), wherein the at least one identification means (19) is associated with the periphery (13, 41, 45) and the at least one identification means (19) extends over at least one edge region (30) of the deformation of the periphery (13, 41, 45),
    wherein the at least one identification means (19) is embedded in a stamping hollow of the periphery (13, 41, 45) by way of an encapsulation (36).

15. A license plate (10) comprising:
    a license plate body (11) defining a license plate surface (12) having a coating and a periphery (13, 41, 45), the periphery at least partially surrounding the license plate surface (12), and the periphery (13, 41, 45) having a deformation; and
    at least one identification means (19), wherein the at least one identification means (19) is associated with the periphery (13, 41, 45) and the at least one identification means (19) extends over at least one edge region (30) of the deformation of the periphery (13, 41, 45)
    wherein the at least one identification means (19) is cast in the periphery (13, 41, 45) at a rear (29) of the license plate (10).

* * * * *